(12) United States Patent
Ishikawa et al.

(10) Patent No.: US 9,871,277 B2
(45) Date of Patent: Jan. 16, 2018

(54) MAGNESIUM-AIR FUEL CELL AND POWER SUPPLY DEVICE USING THE SAME

(71) Applicant: AQUA POWER SYSTEM, JAPAN, Ota-ku, Tokyo (JP)

(72) Inventors: Tadashi Ishikawa, Tokyo (JP); Yoshiaki Hasebe, Tokyo (JP)

(73) Assignee: AQUA POWER SYSTEM, JAPAN, Tokyo (JP)

( * ) Notice: Subject to any disclaimer, the term of this patent is extended or adjusted under 35 U.S.C. 154(b) by 240 days.

(21) Appl. No.: 14/763,526

(22) PCT Filed: Jan. 27, 2014

(86) PCT No.: PCT/JP2014/051714
§ 371 (c)(1),
(2) Date: Jul. 27, 2015

(87) PCT Pub. No.: WO2014/115880
PCT Pub. Date: Jul. 31, 2014

(65) Prior Publication Data
US 2015/0364800 A1    Dec. 17, 2015

(30) Foreign Application Priority Data

Jan. 28, 2013  (JP) ................................ 2013-013724

(51) Int. Cl.
*H01M 12/06*   (2006.01)
(52) U.S. Cl.
CPC .................................. *H01M 12/06* (2013.01)
(58) Field of Classification Search
CPC .................................................... H01M 12/06
See application file for complete search history.

(56) References Cited

U.S. PATENT DOCUMENTS

2005/0019651 A1    1/2005  Tsai et al.

FOREIGN PATENT DOCUMENTS

| JP | 51-121722 U | 10/1976 |
|----|----|----|
| JP | 55-15758 A | 1/1980 |
| JP | 7-45270 A | 2/1995 |
| JP | 2005-515606 A | 5/2005 |
| JP | 3177589 U | 8/2012 |
| JP | 2012-256547 A | 12/2012 |

OTHER PUBLICATIONS

International Search Report dated Mar. 11, 2014, corresponding to International application No. PCT/JP2014/051714

*Primary Examiner* — Carlos Barcena
(74) *Attorney, Agent, or Firm* — Hauptman Ham, LLP (57) ABSTRACT

A magnesium-air fuel cell includes, in an inner portion, a pair of cathode accommodating portions each having at least one end opened. Cathode bodies are each disposed in a corresponding cathode accommodating portion, while having a part exposed to the inner portion. The part of each cathode body is separated from and faces an anode body. A power supply device using the fuel cell includes a supporting portion including a water supply port for the reaction liquid, a base portion incorporating the fuel cell, and a main body including a water supply pipe from the water supply port to the base portion. The water supply pipe is in communication with a water injection port in the fuel cell, and the water supply pipe incorporates a discharge pipe that extends from the supporting portion into the inner portion of the fuel cell and discharges reaction gas produced in the inner portion.

7 Claims, 8 Drawing Sheets

FIG.8 ic fuel cell to stably generate power for a relatively long period of time.

MAGNESIUM-AIR FUEL CELL AND POWER SUPPLY DEVICE USING THE SAME

RELATED APPLICATIONS

The present application is a National Phase of International Application Number PCT/JP2014/051714, filed Jan. 27, 2014, and claims priority from, Japanese Application Number 2013-013724, filed Jan. 28, 2013.

TECHNICAL FIELD

The present invention relates to a fuel cell that generates power by using a fuel such as air or water, and particularly relates to a magnesium-air fuel cell that uses water and a power supply device using the same.

BACKGROUND

Conventionally, magnesium-air fuel cells are known that generate power by using water. For example, Patent Literature 1 discloses a magnesium-air fuel cell that includes: a main body as an outer frame body including a light source; an anode body inserted in the main body; and a cathode body attached to an opening positioned on a side surface of the main body.

CITATION LIST

Patent Literature

{PTL 1} Japanese Utility Model No. 3177589

SUMMARY

Technical Problem

In the magnesium-air fuel cell disclosed in Patent Literature 1, a potential difference is produced between the anode body and the cathode body by injecting reaction liquid such as water and salt water into the main body, whereby required electromotive force is generated. In the magnesium-air fuel cell, more improved electrochemical reaction can be achieved with a shorter distance between the anode body and the cathode body. However, the main body needs to have a relatively small outer size to make the distance small. When the outer size of the main body is relatively small, the amount of the reaction liquid injected into the main body is small, and thus the electromotive force cannot be generated produced for a relatively long period of time.

An object of the present invention is to improve the magnesium-air fuel cells in the conventional technique, and is to provide a magnesium-air fuel cell in which a relatively large amount of reaction liquid can be injected with a relative small distance between the anode body and the cathode body and thus can generate the required electromotive force stably for a certain period of time, and a power supply device using the magnesium-air fuel cell.

Solution to Problem

To solve the problem, a first aspect of the present invention is related to a magnesium-air fuel cell having a height direction and a width direction and including: a main body, an anode body positioned in the main body, and cathode bodies positioned on both sides of the anode body in the width direction.

To solve the problem, a second aspect of the present invention is related to a power supply device using the magnesium-air fuel cell according to the first aspect as a power source.

In the magnesium-air fuel cell according to the first aspect of the present invention, the main body includes in an inner portion, a pair of cathode accommodating portions each extending in the height direction and having at least one end opened, the cathode bodies are each disposed in a corresponding one of the cathode accommodating portion, while having a part exposed to the inner portion, and the part of the cathode body is separated from and faces the anode body in the width direction.

The power supply device according to the second aspect of the present invention includes: a supporting portion including a water supply port for the reaction liquid; a base portion incorporating the magnesium-air fuel cell; and a main body including a water supply pipe extending from the water supply port to the base portion. The water supply pipe is in communication with a water injection port formed in the magnesium-air fuel cell. The water supply pipe incorporates a discharge pipe that extends from the supporting portion into the inner portion of the magnesium-air fuel cell and discharges reaction gas produced in the inner portion.

According to the first aspect of the present invention, the cathode accommodating portion may include first and second opening ends communicated with each other in the height direction, and an inner frame portion positioned on a side facing the anode body, and the cathode body having a thin plate shape may be disposed on the inner frame portion.

According to a first aspect of the present invention, the magnesium-air fuel cell may further have a depth direction. The cathode accommodating portion may be positioned on an inner side with respect to a liquid surface of a liquid injected area including reaction liquid injected in the inner portion of the main body, in the depth direction.

According to a first aspect of the present invention, the cathode bodies may be separated from the anode body by a substantially equal distance of about 5.0 to 15.0 mm.

According to a first aspect of the present invention, the anode body may be disposed on a lid removably attached to the main body. A guide plate having a through hole in which the anode body is inserted may be disposed between the cathode accommodating portions.

According to a first aspect of the present invention, a distance between the liquid surface and a surface of each of the cathode accommodating portions facing the liquid surface in the depth direction may be 2.0 to 5.0 mm.

According to a second aspect of the present invention, an upper opening end of the discharge pipe may be positioned above the water supply port.

Advantageous Effects of Invention

In the magnesium-air fuel cell according to the first aspect of the present invention, the cathode bodies in the cathode accommodating portions are disposed on both sides of the anode body while being in contact with outer air and the liquid injected area in the main body and are disposed relatively close to the anode body. Thus, an excellent power generation efficiency can be achieved. Furthermore, the power can be stably generated for a relatively long period of time because the main body has the liquid injected area with a required capacity. The power supply device according to the second invention can stably supply power with excellent power generation efficiency by causing the magnesium-air fuel cell, used as a power source, to generate power safely with a relatively easy operation.

BRIEF DESCRIPTION OF DRAWINGS

The drawings illustrate specific embodiments of the present invention including optional and preferred embodiments as well as essential features of the invention.

DESCRIPTION OF EMBODIMENTS

First Embodiment

Figure 1:
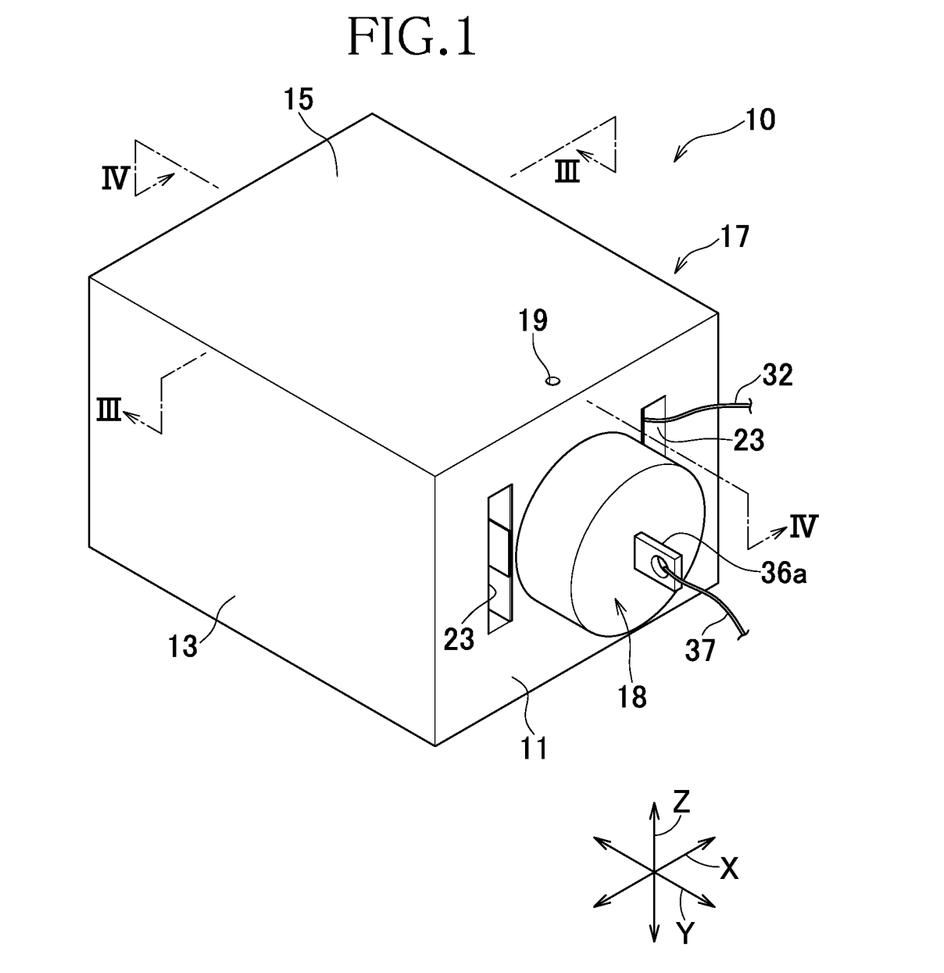
FIG. 1 is a perspective view of a magnesium-air fuel cell according to a first embodiment of the present invention.
Figure 2:
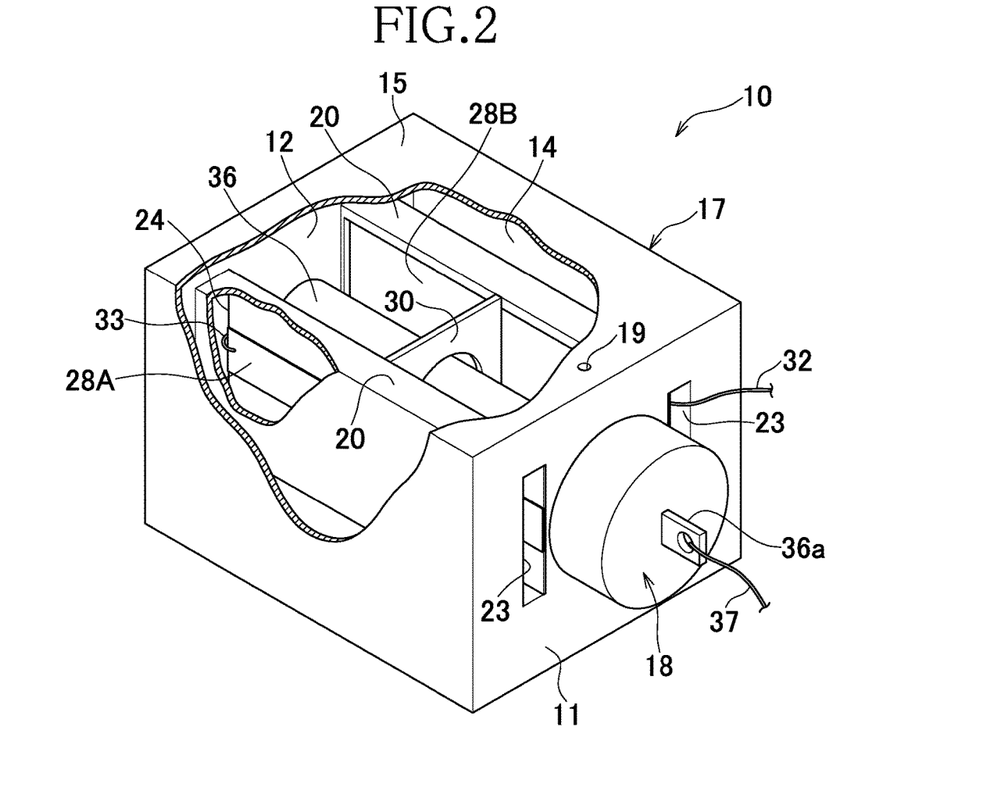
FIG. 2 is a partially cutout perspective view of the magnesium-air fuel cell.

As illustrated in FIGS. 1 and 2, for a magnesium-air fuel cell 10 according to the present embodiment, a height direction Y and a width direction X, as well as a depth direction Z orthogonal to the directions are defined. The magnesium-air fuel cell 10 includes a main body 17 made of rigid plastic. The main body 17 includes: first and second surfaces 11 and 12 facing each other in the height direction Y; third and fourth surfaces 13 and 14 facing each other in the depth direction Z; and a fifth surface 15 and a sixth surface 16 facing each other in the width direction X. The magnesium-air fuel cell 10 includes a lid 18 that is removably attached to the main body 17. A through hole 19 is formed in the fifth surface 15 of the main body 17. Hydrogen gas, generated when an electrochemical reaction occurs in the magnesium-air fuel cell 10, is discharged through the through hole 19. An anode body 36 and a pair of cathode bodies (air electrodes) 28A and 28B, that are separated from and face each other in the width direction X, are positioned in the main body 17.

The main body 17 includes a pair of cathode accommodating portions 20 respectively incorporating the cathode bodies 28A and 28B extending in the height direction Y. The cathode accommodating portion 20 has a cornered U shaped cross section opening toward the inner side and includes an outer side surface 21, an upper surface 22a that is separated from and faces the fifth surface 15, a lower surface 22b that is separated from and faces the sixth surface 16, a rectangular first opening end (slot) 23 positioned on the first surface 11, and a rectangular second opening end (slot) 24 positioned on the second surface 12. The cathode accommodating portion 20 further includes inner frame portions 25 formed of bent portions that are bent from the upper and lower surfaces 22a and 22b to extend inward in the depth direction Z and are separated from and face each other in the depth direction Z. The cathode bodies 28A and 28B are fixed to the inner frame portions 25 of the cathode accommodating portion 20 in a removable or fixed manner, and thus are disposed to be constantly in contact with outer air flowing into the cathode accommodating portion 20. A guide plate 30 that is made of rigid plastic and has a through hole at the center is disposed between the pair of cathode accommodating portions 20. The guide plate 30 has corner portions with outer surfaces fixed to the inner frame portions 25 of the cathode accommodating portions 20. The cathode bodies 28A and 28B, disposed on the guide plate 30, are electrically connected to each other through lead wires 33 exposed from the second opening ends 24. A lead wire 32 extending to the outside through the first opening end 23 is attached to the cathode body 28B. In the present embodiment, the cathode accommodating portion 20 includes the first and the second opening ends 23 and 24 respectively positioned in the first and the second surfaces 11 and 12. Alternatively, the cathode accommodating portions 20 may be shorter than the main body 17 in the height direction Y. One of the cathode accommodating portions 20 may be a closing end that is positioned within the main body 17.

The lid 18 includes at least one engagement protrusion on the entire inner circumference surface, and is detachably fit to engagement protrusions formed on the entire outer circumference surface of a cylindrical portion 35 disposed between the first opening ends 23 in the first surface 11 of the main body 17. An end portion of the anode body 36 having a rod shape is inserted and attached to the through hole positioned at the center portion of the lid 18. A lead wire 37 is attached to an opening in an end portion 36a of the anode body 36. When the lid 18 is fit to the main body 17, the anode body 36 is inserted in the through hole of the guide plate 30. The anode body 36 is guided by the guide plate 30 to be at a predetermined position when the lid 18 is inserted, and thus is prevented from being inclined and inserted in the opening of the cylindrical portion 35 to be prevented from coming into contact with the cathode bodies 28A and 28B.

The cathode bodies 28A and 28B each have a multilayered structure in which a first layer (electrode layer) and a second layer (active layer) are stacked on top of the other. The first layer is made of a conductive material such as a carbon material. The second layer is formed of a cathode active material such as activated carbon. The cathode bodies 28A and 28B are each preferably air-permeable-liquid-impermeable as a whole. The cathode bodies 28A and 28B may each have a three-layer structure, in which a third layer (collector layer) having a plate shape and the first and the second layers are stacked on top of the other, to achieve a higher power collecting efficiency. The third layer is formed of conductive metal. An electrode active material with relatively high ionization tendency such as magnesium metal, aluminum, and zinc may be used for the anode body 36.

Figure 3:
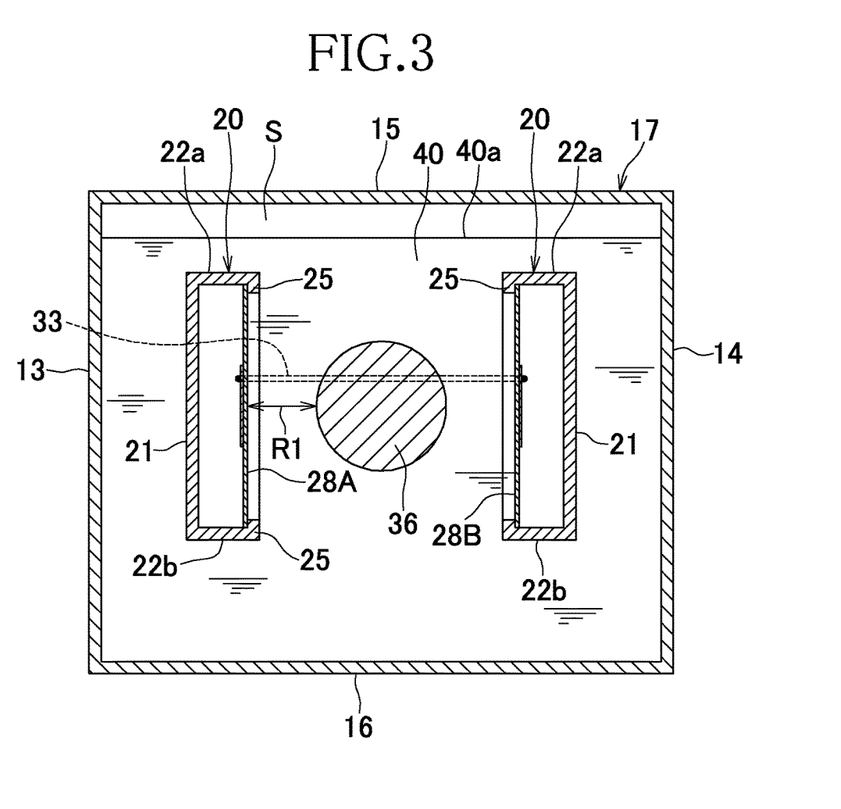
FIG. 3 is a schematic cross-sectional view taken along line III-III in FIG. 1.
Figure 4:
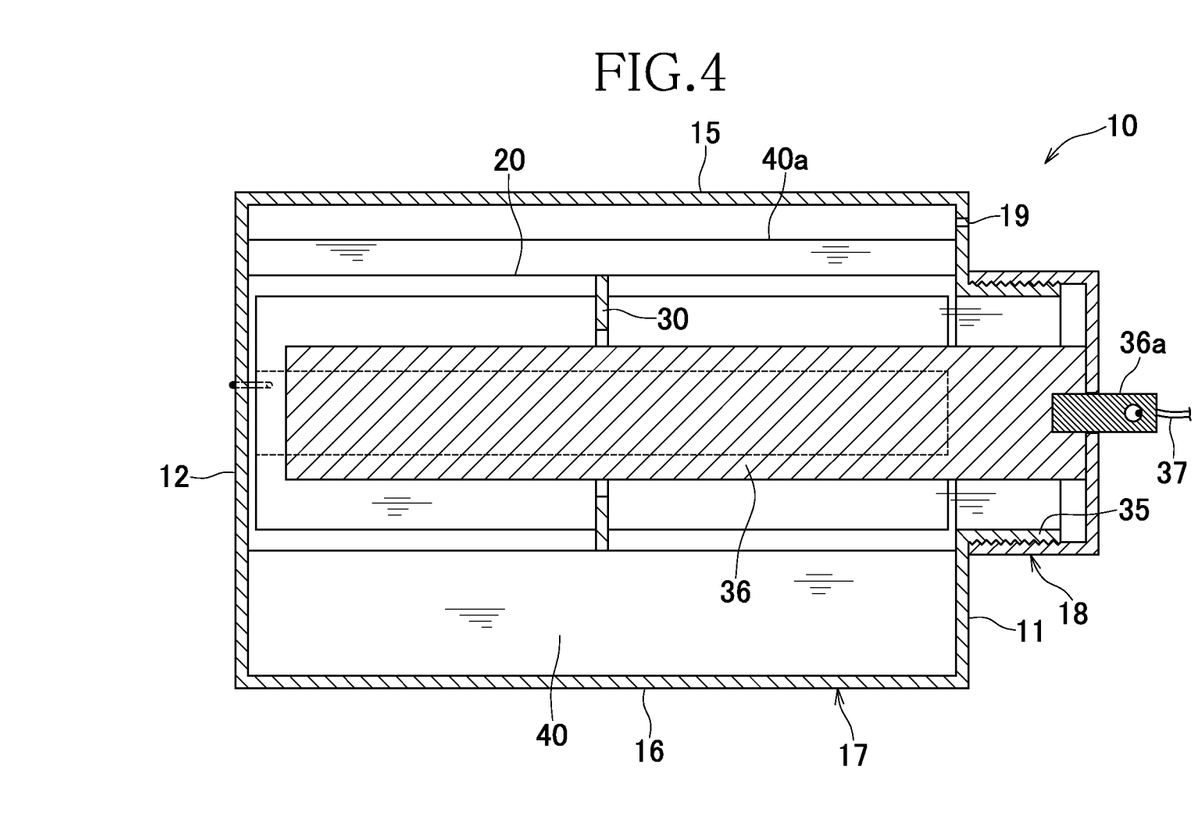
FIG. 4 is a schematic cross-sectional view taken along line IV-IV in FIG. 1.

In the magnesium-air fuel cell 10 having the configuration described above, a required amount of reaction liquid (water, salt water, and the like) is injected into the main body 17, and thus a liquid injected area 40 and a space S positioned above the liquid injected area 40 are formed in the main body 17. The cathode accommodating portions 20 and the anode body 36 are positioned in the liquid injected area 40. The reaction liquid serves as an oxidation catalyst causing an ionization reaction between the cathode bodies 28A and 28B and the anode body 36. Then, electrons produced from the ionized anode body 36 react with oxygen in the cathode bodies 28A and 28B and with water in the reaction liquid to cause a discharge reaction. Thus, due to the resultant potential difference between the cathode bodies 28A and 28B and the anode body 36, predetermined electromotive force is generated. When such electrochemical reaction occurs, precipitate such as magnesium hydroxide and reactant gas (hydrogen gas) is produced in the main body 17. Electrolyte solution other than water such as salt water may be used as the reaction liquid. The anode body 36 may not be attached to the lid 18 and may be directly fixed to the main body 17 as long as the effect of the present invention described later can be obtained. Still, when the anode body 36 is attached to the lid 18, the electrochemical reaction can be terminated (stopped) and the generation of the electromotive force can be stopped by removing the lid 18 from the main body 17 so that the anode body 36 in the main body 17 is pulled out. Thus, turning ON and OFF of the power supply of the magnesium-air fuel cell 10 can be achieved by attaching and removing the lid 18. When the lid 18 is removed, the reaction liquid such as water can be injected into the main body 17, or the reaction liquid in the main body 17 can be discharged to inject new reaction liquid.

As illustrated in FIG. 3, when the lid 18 is fit to the main body 17, the anode body 36 is positioned substantially at the center between the cathode bodies 28A and 28B. The reaction liquid in an amount corresponding to about 70 to 90% of the capacity of the entire main body 17 is injected in the main body 17. A liquid surface 40a of the reaction liquid is positioned on the outer side with respect to the upper surface 22a of the cathode accommodating portion in the height direction Y. The cathode accommodating portion 20 and the anode body 36 are entirely positioned within the liquid injected area 40. Generally, when a configuration in which the cathode bodies 28A and 28B are disposed on outer circumference walls of the main body 17 is employed, the main body 17 has an outer size of required lengths so that the capacity for accommodating the required reaction liquid is ensured. Thus, the distance between the cathode body, disposed on the outer circumference wall, and the anode body, disposed in the main body, is relatively large. As a result, the ionization efficiency is degraded and the desired electromotive force cannot be generated. On the other hand, when the outer size of the main body is set to be small to achieve a short distance between the cathode body and the anode body, the required reaction liquid cannot be injected. Thus, it is difficult to continuously generate the desired electromotive force stably for a long period of time.

In the magnesium-air fuel cell 10 of the present embodiment, the cathode accommodating portions 20 are positioned on both sides of the anode body 36 in the liquid injected area 40. The cathode bodies 28A and 28B are disposed on the cathode accommodating portions 20 to be in contact with the outer air and the reaction liquid. Thus, a relatively small distance between the cathode bodies 28A and 28B can be achieved to improve the ionization efficiency. Furthermore, the main body 17 has an outer size corresponding to the predetermined capacity so that a sufficient amount of reaction liquid can be injected, and the desired electromotive force can be continuously generated stably for a long period of time. Specifically, a distance R1 between the anode body 36 and each of the cathode bodies 28A and 28B in the width direction X is preferably about 5.0 to 15.0 mm. When the distance R1, which differs in accordance with the curvature of the cylindrical outer shape of the anode body 36, is about 15.0 mm or larger, the ionization efficiency might degrade. When the distance R1 is about 5.0 mm or smaller, the anode body 36 is too close to the cathode bodies 28A and 28B, and thus the magnesium hydroxide generated by the oxidation reaction of the anode body 36 attaches the cathode bodies 28A and 28B and thus, the ionization efficiency might be degraded.

The cathode accommodating portion 20 is positioned in the liquid injected area 40 without being in contact with the surfaces of the main body 17, and thus does not divide the inner space of the main body 17. All things considered, with the cathode accommodating portions 20, the reduction of the capacity can be minimized. When the widths of the first and the second opening ends 23 and 24 are set to be smaller than that in the illustrated embodiment, the liquid injected area 40 can have a larger capacity.

Figure 5:
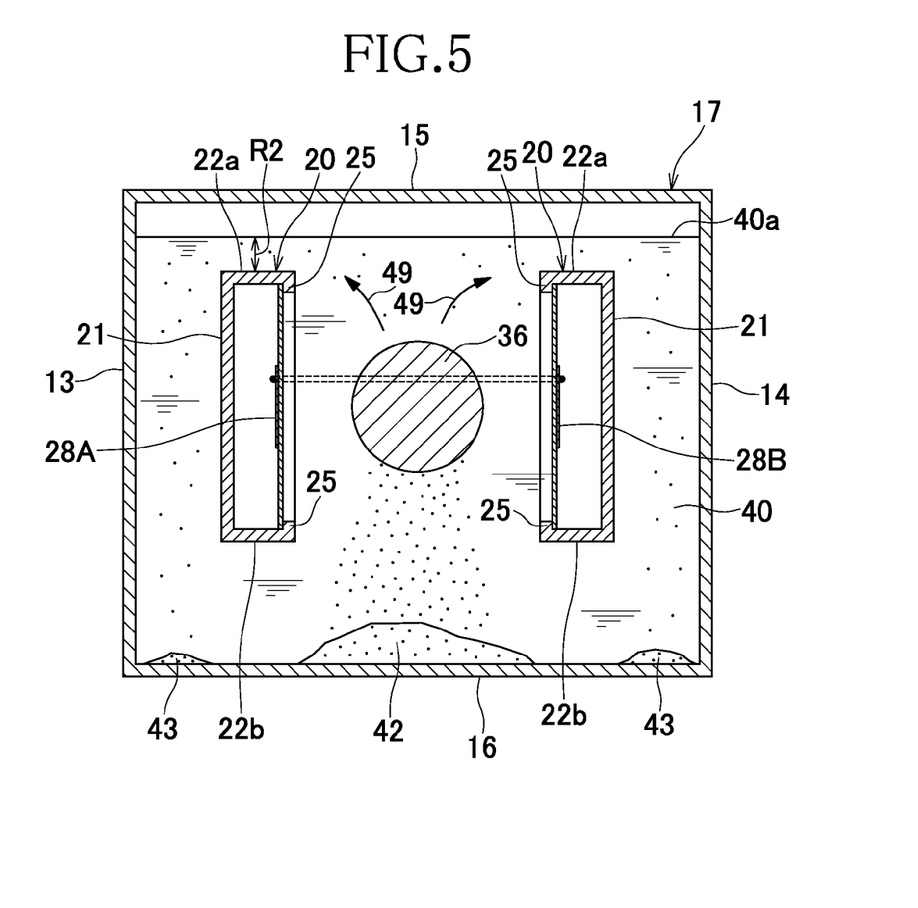
FIG. 5 is a cross-sectional view, similar to that in FIG. 3, illustrating a state where precipitate is deposited.

As the electrochemical reaction of the cell 10 proceeds, the precipitate produced from the anode body 36 is deposited on the bottom (side of the sixth surface 16) as illustrated in FIG. 5. More specifically, precipitate (such as zinc oxide) 42 with a relatively large relative density is deposited on a portion directly below the anode body 36, and different precipitate (such as magnesium oxide) 43 with a relatively small relative density is deposited on both sides of the precipitate 42. As described above, hydrogen gas is produced as the electrochemical reaction proceeds, and thus an upward convective flow 49 is produced in the liquid injected area 40. When the convective flow 49 is produced in the liquid injected area 40, the precipitate 43, with a relatively small relative density, moves upward to pass through the portions in the liquid injected area 40 above the cathode accommodating portions 20 to further move toward the outer sides of the cathode accommodating portions 20 in the width direction X, and then moves downward to be deposited. On the other hand, the precipitate 42, with a relatively large relative density, is not moved upward by the convective flow 49, and thus deposits directly below the anode body 36. As described above, the precipitate 42 and the precipitate 43 produced from the anode body 36 are different from each other in the deposited position due to the relative densities, and thus are deposited over the entire area without being deposited locally on the bottom surface of the main body 17. Thus, clogging, which may occur when all of the precipitate 42 and the precipitate 43 are deposited on the portion directly below the anode body 36, can be prevented. Furthermore, the precipitate 42 and the precipitate 43 can be prevented from attaching the anode body 36 to hinder the ionization reaction. To make the precipitate 43, with a relatively small relative density, pass through the portion directly above the upper surface 22a of the cathode accommodating portion 20, a distance R2 between the liquid surface 40a of the liquid injected area 40 and the upper surface 22a, as the passing portion, is preferably about 2.0 to 5.0 mm. This is because when the distance R2 is 2.0 mm or smaller, the precipitate 43 might be not moved by the convective flow 49, and might float on the liquid surface.

Second Embodiment

Figure 6:
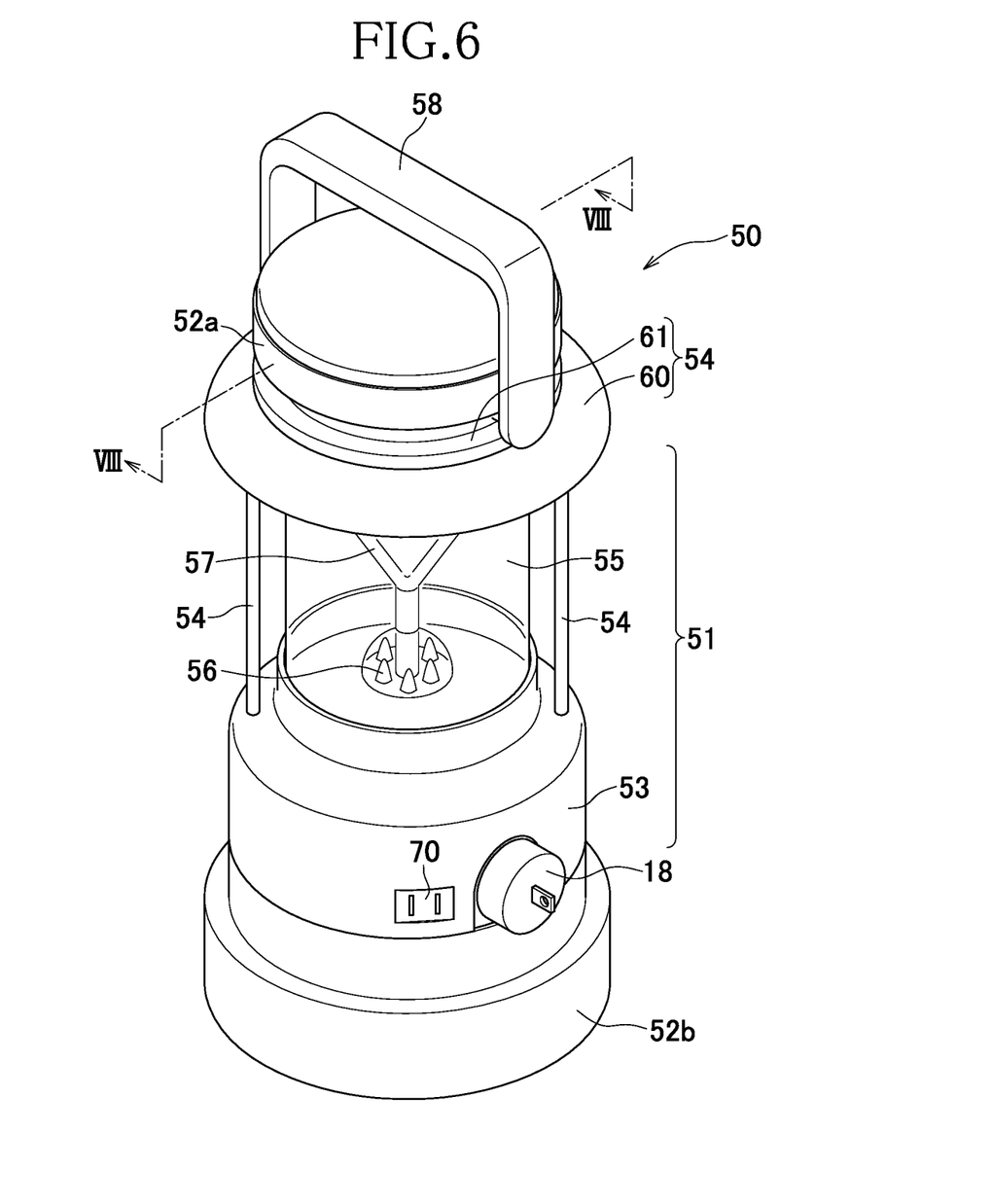
FIG. 6 is a perspective view of a power supply device, using the magnesium-air fuel cell, according to a second embodiment.
Figure 7:
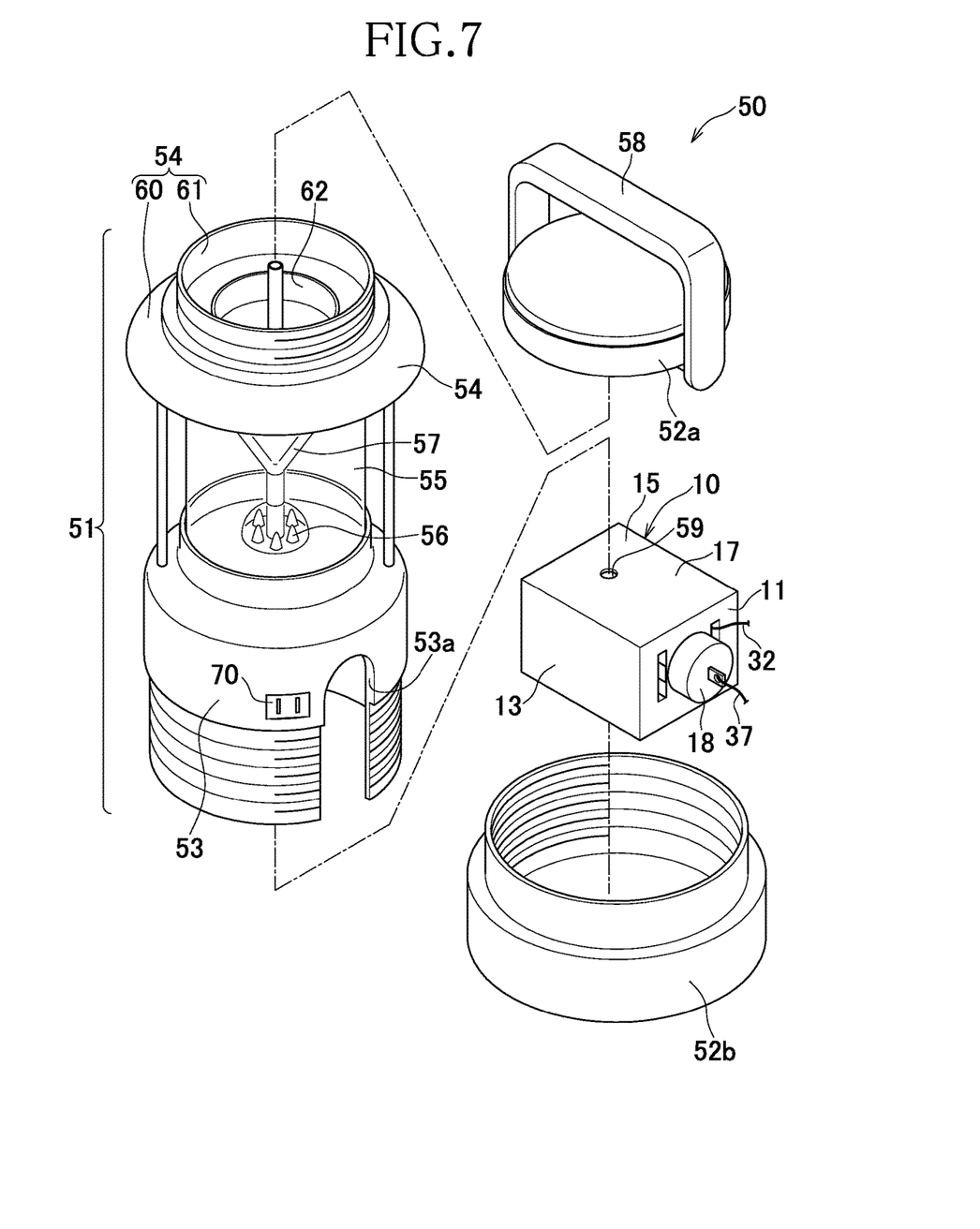
FIG. 7 is an exploded perspective view of the power supply device in a state where an upper lid is removed.

FIG. 6 is a perspective view of a (illumination) power supply device 50, including an LED illumination using the magnesium-air fuel cell 10, according to a second embodiment. FIG. 7 is a schematic cross-sectional view of FIG. 6.

The power supply device 50 includes a main body 51 and upper and lower lids 52a and 52b that are removably attached to the main body 51. The main body 51 includes: a base portion 53; a supporting portion 54 coupled to the base portion 53 via a column; a cylindrical body 55 formed of a transparent or semitransparent plastic or glass tube or the like fixed via a flange positioned on an upper end of the base portion 53; a light source 56 formed of a plurality of LED lamps that are in the cylindrical body 55 and at the center of the base portion 53; and a hollow reflecting member 57 that has a conical shape sharply extending toward the light source and reflects the light from the light source 56. The upper lid 52a is removably fit to the supporting portion 54 and includes a handle portion 58. The lower lid 52b is removably fit to the base portion 53, and the magnesium-air fuel cell 10 is disposed in an inner space formed by the base portion 53 and the lower lid 52b. The lid 18 of the magnesium-air fuel cell 10 is positioned at a notch 53a of the base portion 53 and thus is exposed to the outside. A water injection port 59 is formed at the center of the upper surface (the fifth surface 15).

Figure 8:
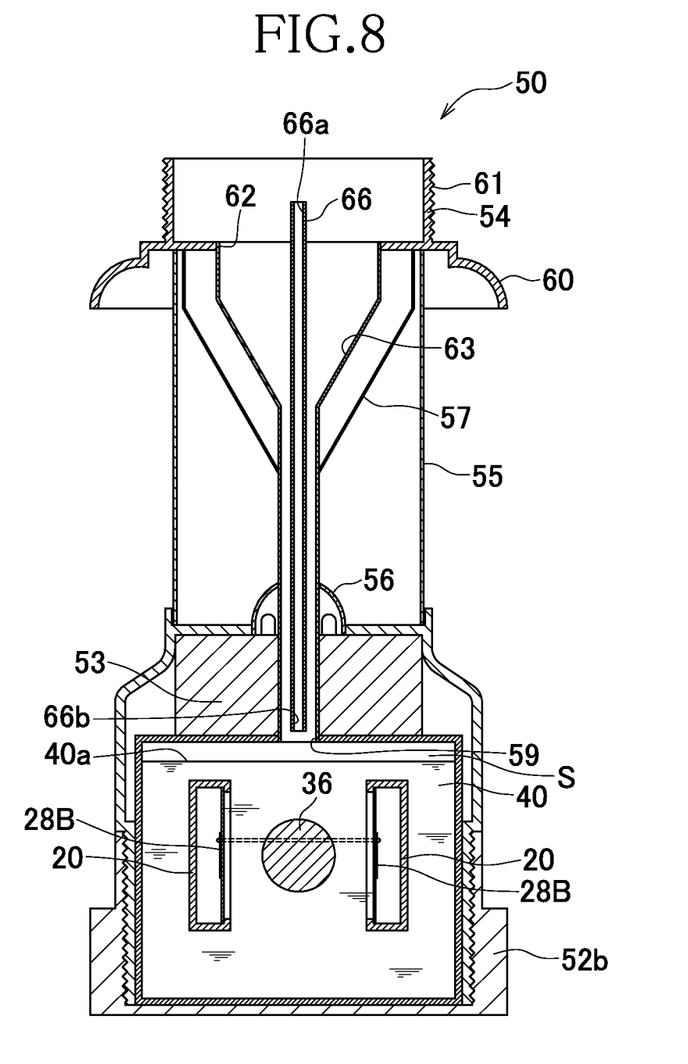
FIG. 8 is a schematic cross-sectional view taken along line VIII-VIII in FIG. 6.

The supporting portion 54 includes a cover portion 60 to which the cylindrical body 55 is fixed and a bottomed liquid supplied portion 61 extending from the cover portion 60. A water supply port 62 is disposed at the center of the bottom portion of the liquid supplied portion 61. A water supply pipe 63, extending downward from the water supply port 62, penetrates through the reflecting member 57, the light source 56, and the base portion 53 to extend to the water injection port 59 of the magnesium-air fuel cell 10 in the cylindrical body 55. A discharge pipe (discharge straw) 66, having upper and lower opening ends 66a and 66b, is formed at the center of the water supply port 62. The discharge pipe 66 penetrates through the reflecting member 57, the light source 56, and the base portion 53, together with the water supply pipe 63. A socket portion 70 is positioned on the base portion 53. The socket portion 70 includes a plug entry port for charging an electronic device such as a mobile phone, personal digital assistance (PDA), and portable music player. Although not elaborated in the figure, the lead wires 32 and 37 extending from the cathode bodies 28A and 28B and the anode body 36 of the cell 10 are electrically connected to the light source and the lead wire. The power supply device 50 may not include the light source 56 and the reflecting plate 57, and may be used to supply external power supply to the electronic device having no illumination function.

In the magnesium-air fuel cell 10 having the configuration described above, the upper lid 52a is removed and the reaction liquid (such as water or salt water) is supplied to the liquid supplied portion 61 of the supporting portion 54. The reaction liquid supplied to the liquid supplied portion 61 flows downward through the water supply port 62 and the water supply pipe 63 to be injected into the magnesium-air fuel cell 10 through the water injection port 59. The water supply pipe 63 has a shape with a diameter gradually reducing toward the lower side from the water supply port 62 in the reflecting member 57, to facilitate the downward movement of the reaction liquid. The hydrogen gas filled in the magnesium-air fuel cell 10 can be discharged outside through the discharge pipe 66 positioned at the center of the water supply pipe 63. Thus, there is no risk of disabling the reaction liquid supply and cracking or bursting of the main body of the magnesium-air fuel cell 10, due to the pressure increase in the magnesium-air fuel cell 10 caused by the generated gas. Furthermore, the discharge pipe 66 provides an effect that the reaction liquid can be easily injected into the magnesium-air fuel cell 10 with the internal air discharged. As illustrated in FIG. 8, the upper opening end 66a of the discharge pipe 66 is positioned above the water supply port 62. With the upper opening end 66a of the discharge pipe 66 positioned above the water supply port 62 as described above, the reaction liquid moving downward from the water supply port 62 flows in through the upper opening end 66a of the discharge pipe 66 and thus does not hinder the discharging of gas. The lower opening end 66b of the discharge pipe 66 is positioned above the water injection port 59. With the lower opening end 66b positioned above the water injection port 59 as described above, the reaction liquid does not move upward from the lower opening end 66b of the discharge pipe 66, even when the liquid surface 40a of the liquid injected area 40 is positioned close to the water injection port 59.

As described above, when the power supply device 50 is activated, the upper lid 52a is removed and the reaction liquid is supplied to the liquid supplied portion 61, and the reaction liquid is injected into the magnesium-air fuel cell 10 through the water supply pipe 63. Thus, the operation can be easily performed compared with a case where the lower lid 52b is removed and the magnesium-air fuel cell 10 is taken out from the base portion 53, and then the reaction liquid is directly injected through the water injection port 59. The reaction gas can be discharged through the discharge pipe 66, and thus the pressure in the main body 17 can be prevented from being high, whereby excellent safety can be achieved.

Components of the magnesium-air fuel cell 10 are not limited to the above-described components, and any other components used for an item of this type may be used. The lengths of the components in the embodiments may be appropriately changed in accordance with a required magnitude of electromotive force.

The invention claimed is:

1. A magnesium-air fuel cell having a height direction and a width direction, the magnesium-air fuel cell comprising:
   a main body;
   an anode body positioned in the main body; and
   cathode bodies positioned on both sides of the anode body in the width direction,
   wherein
   the main body includes, in an inner portion, a pair of cathode accommodating portions each extending in the height direction and having at least one end opened,
   the cathode bodies are each disposed in a corresponding one of the cathode accommodating portions, while having a part exposed to the inner portion, and
   the part of each of the cathode bodies is separated from and faces the anode body in the width direction, and
   wherein
   each of the cathode accommodating portions includes:
   first and second opening ends communicated with each other in the height direction; and
   an inner frame portion positioned on a side facing the anode body, and
   the cathode body disposed in said each of the cathode accommodating portions has a plate shape and is disposed on the inner frame portion.

2. The magnesium-air fuel cell according to claim 1, wherein
   the magnesium-air fuel cell further has a depth direction,
   the cathode accommodating portions are positioned on an inner side with respect to a liquid surface of a liquid injected area including reaction liquid injected in the inner portion of the main body, in the depth direction.

3. The magnesium-air fuel cell according to claim 2, wherein
   the cathode bodies are separated from the anode body by a substantially equal distance of about 5.0 mm to 15.0 mm.

4. The magnesium-air fuel cell according to claim 1, wherein
   the anode body is disposed on a lid removably attached to the main body, and a guide plate having a through hole in which the anode body is inserted is disposed between the cathode accommodating portions.

5. The magnesium-air fuel cell according to claim 2, wherein a distance between the liquid surface and a surface of each of the cathode accommodating portions facing the liquid surface in the depth direction is 2.0 mm to 5.0 mm.

6. A power supply device having the magnesium-air fuel cell according claim 1 as a power source, the power supply device comprising:
 a supporting portion including a water supply port for reaction liquid;
 a base portion incorporating the magnesium-air fuel cell; and
 a main body including a water supply pipe extending from the water supply port to the base portion, wherein
 the water supply pipe is in communication with a water injection port formed in the magnesium-air fuel cell, and
 the water supply pipe incorporates a discharge pipe that extends from the supporting portion into the inner portion of the magnesium-air fuel cell to discharge reaction gas produced in the inner portion.

7. The power supply device according to claim 6, wherein an upper opening end of the discharge pipe is positioned above the water supply port.

\* \* \* \* \*